US009146144B2

(12) United States Patent
Hui et al.

(10) Patent No.: US 9,146,144 B2
(45) Date of Patent: Sep. 29, 2015

(54) PORTABLE REFILLABLE CREAM DISPENSER

(75) Inventors: Yi Ming Hui, Guangdong (CN); Zhi Wang, Guangdong (CN)

(73) Assignee: DONGGUAN YIXIN MAGNETIC DISK CO., LTD., Guangdong (CN)

( * ) Notice: Subject to any disclaimer, the term of this patent is extended or adjusted under 35 U.S.C. 154(b) by 0 days.

(21) Appl. No.: 13/558,653

(22) Filed: Jul. 26, 2012

(65) Prior Publication Data

US 2013/0068796 A1     Mar. 21, 2013

(30) Foreign Application Priority Data

Aug. 2, 2011   (CN) .......................... 2011 1 0219030

(51) Int. Cl.
  *G01F 11/00*    (2006.01)
  *G01F 11/02*    (2006.01)
  *B65B 3/10*     (2006.01)
  *B05B 11/00*    (2006.01)

(52) U.S. Cl.
  CPC .......... *G01F 11/028* (2013.01); *B05B 11/0056* (2013.01); *B65B 3/10* (2013.01)

(58) Field of Classification Search
  CPC .............................. B65B 3/10; B05B 11/0056
  USPC ........... 222/256, 388; 141/18, 25, 26, 27, 113
  See application file for complete search history.

(56) References Cited

U.S. PATENT DOCUMENTS

| | | | |
|---|---|---|---|
| 2,643,535 A | 12/1948 | Strumbos | |
| 3,559,701 A | 2/1971 | Wittersheim et al. | |
| 3,601,164 A | 8/1971 | Bruce | |
| 3,601,165 A | 8/1971 | Obata | |
| 3,718,165 A | 2/1973 | Grothoff | |
| 4,197,884 A | 4/1980 | Maran | |

(Continued)

FOREIGN PATENT DOCUMENTS

| | | |
|---|---|---|
| CN | 2114634 U | 9/1992 |
| CN | 201055827 Y | 5/2008 |

(Continued)

OTHER PUBLICATIONS

Merriam-Webster—into; http://www.merriam-webster.com/dictionary/into.*

(Continued)

*Primary Examiner* — Paul R Durand
*Assistant Examiner* — Benjamin R Shaw
(74) *Attorney, Agent, or Firm* — William H. Dippert; Eckert Seamans Cherin & Mellott, LLC

(57) ABSTRACT

A refillable dispenser for viscous compositions comprises a bottle having walls defining an upper cavity and a lower cavity, a viscous composition refill mechanism configured to allow viscous composition to enter the upper cavity when the refill mechanism is fluidly coupled to a viscous composition source and a viscous composition dispensing mechanism configured to allow viscous composition to be dispensed from the upper cavity to outside the bottle when the dispensing mechanism is actuated. A gasket configured to substantially seal the upper cavity from the lower cavity is provided wherein the gasket is capable of moving towards the upper cavity upon actuation of the dispensing mechanism and moving towards the lower cavity upon entrance of the viscous composition into the upper cavity.

19 Claims, 6 Drawing Sheets

(56) References Cited

U.S. PATENT DOCUMENTS

| | | | |
|---|---|---|---|
| 4,473,097 A | | 9/1984 | Knickerbocker et al. |
| 4,662,412 A | | 5/1987 | Swallert |
| 4,750,532 A | * | 6/1988 | Grothoff ................. 141/27 |
| 4,877,065 A | | 10/1989 | Lamboy et al. |
| 4,988,017 A | | 1/1991 | Schrader et al. |
| 5,524,680 A | | 6/1996 | de Laforcade |
| 5,623,974 A | | 4/1997 | Losenno et al. |
| 5,638,992 A | * | 6/1997 | Lim et al. ................. 222/129 |
| 5,791,527 A | | 8/1998 | Giuffredi |
| 5,865,350 A | | 2/1999 | Losenno et al. |
| 6,170,537 B1 | | 1/2001 | Lasserre |
| 6,202,900 B1 | | 3/2001 | Tsutsui et al. |
| 6,435,231 B1 | | 8/2002 | Cooper et al. |
| 6,533,482 B1 | | 3/2003 | Byun |
| 6,607,012 B2 | | 8/2003 | Yquel |
| 6,698,620 B2 | | 3/2004 | Ogata et al. |
| 6,857,806 B2 | | 2/2005 | Harrison et al. |
| 6,883,564 B2 | | 4/2005 | Risch et al. |
| 7,377,296 B2 | | 5/2008 | Gueret |
| 7,665,635 B2 | * | 2/2010 | Ramet et al. ............. 222/321.7 |
| 8,079,388 B2 | * | 12/2011 | Turgeman .................. 141/113 |
| 2002/0057938 A1 | | 5/2002 | Gueret |
| 2003/0184624 A1 | | 10/2003 | Kinalski |
| 2005/0284891 A1 | | 12/2005 | Ramet et al. |
| 2006/0075924 A1 | | 4/2006 | Kobayashi et al. |
| 2007/0020032 A1 | | 1/2007 | Abbas |
| 2007/0041774 A1 | * | 2/2007 | Tourigny .................... 401/11 |
| 2009/0014481 A1 | * | 1/2009 | Benetti ..................... 222/563 |
| 2011/0297275 A1 | * | 12/2011 | Farrar et al. ............... 141/113 |

FOREIGN PATENT DOCUMENTS

| | | |
|---|---|---|
| DE | 1166225 | 9/1958 |
| DE | 1798193 | 10/1959 |
| DE | 1802692 | 12/1959 |
| DE | 1823288 | 12/1960 |
| DE | 1968728 | 9/1967 |
| DE | 2540876 | 9/1975 |
| DE | 8307900 U1 | 3/1983 |
| EP | 1283180 A2 | 2/2003 |
| FR | 2073087 | 9/1971 |
| FR | 2698341 A1 | 11/1992 |
| FR | 2893598 A1 | 11/2005 |
| GB | 938331 | 11/1959 |
| GB | 2095103 | 9/1982 |
| GB | 2137181 A | 2/1984 |
| GB | 2229380 | 9/1990 |
| JP | 5125605 | 8/1975 |
| JP | 8175578 A | 7/1996 |
| JP | 2004182305 A | 7/2004 |
| WO | 0243794 A1 | 6/2002 |
| WO | 2005101969 A2 | 11/2005 |
| WO | WO 2010094963 A1 * | 8/2010 |

OTHER PUBLICATIONS www.travalo.com; "Travalo Wherever You Go"; Jul. 7, 2010.
Request for reexamination of U.S. Pat. No. 8,079,368, Dated Jul. 24, 2013 (Reexamination Control No. 90/012,926.
Corrected Request for Reexamination of U.S. Pat. No. 8,079,388, Dated Sep. 3, 2013 (Reexamination Control No. 90/012,926.

* cited by examiner

PORTABLE REFILLABLE CREAM DISPENSER

FIELD OF THE INVENTION

The present invention relates to dispensers of viscous materials such as creams.

BACKGROUND OF THE INVENTION

PCT Publ. No. WO2005/101969 describes a refill bottle adapted to repeatedly receive and dispense liquid such as perfume. The refill bottle comprises a bottle having a bottom portion and an upper portion, an opening provided in the upper portion wherein the opening is adapted to be covered, and a refill mechanism provided in the bottom portion. The liquid is received through the refill mechanism from a regular bottle preferably provided with a spraying mechanism and is dispensed through the opening.

The refill bottle described in WO2005/101969 is unsuitable for viscous materials such as pastes, creams and liquid soaps. For example, cream might accumulate in large amounts in areas of the dispenser interior that are inaccessible to dispensing means of the bottle.

Commercially available cream dispensing bottles are not reusable; moreover, they are usually made of hard and thick plastic to endure mechanical abuse such as accidental drops, and are thus a serious environmental liability.

One object is to provide a cream bottle that is refillable; another object is to configure such bottle to allow refilling it in small amounts which are essentially dispensable from the bottle; another object is to configure the bottle so that the cream in the bottle can be substantially emptied out of the bottle by operating a dispensing mechanism.

SUMMARY OF THE INVENTION

In the claims, the word "comprise", and variations thereof such as "comprises", "comprising" and the like indicate that the components listed are included, but not generally to the exclusion of other components.

According to one aspect, a refillable dispenser for viscous compositions is provided, the dispenser comprising:
- a bottle having walls defining an upper cavity and a lower cavity;
- a viscous composition refill mechanism configured to allow viscous composition to enter said upper cavity when said refill mechanism is fluidly coupled to a viscous composition source;
- a viscous composition dispensing mechanism configured to allow viscous composition to be dispensed from said upper cavity to outside the bottle when the dispensing mechanism is actuated;
- a gasket configured to substantially seal said upper cavity from said lower cavity wherein said gasket is capable of moving towards the upper cavity upon actuation of the dispensing mechanism and moving towards the lower cavity upon entrance of the viscous composition into said upper cavity.

In some embodiments, the refill mechanism extends throughout the gasket to the upper cavity.

For example, a tube extends into the upper cavity.

Alternatively, the refill mechanism directly extends into the upper cavity.

In some embodiments, the refill mechanism comprises a check-valve.

In some embodiments, the dispensing mechanism comprises a check valve.

In some embodiments, the refill mechanism and the dispensing mechanism each comprise a check-valve.

According to another aspect, a kit is provided, comprising: any of the refillable dispensers defined above and at least one adapter, the adapters each configured to allow sealingly and fluidly coupling a non-refillable dispenser for viscous compositions with the refill mechanism of the refillable dispenser.

In some kit embodiments the kit comprises: the refillable dispenser and a non-refillable dispenser for viscous compositions, the refillable dispenser and a non-refillable dispenser sealingly and fluidly coupleable thereto. Typically, the non-refillable dispenser is substantially larger than the refillable dispenser.

In embodiments comprising a tube, gasket is preferably sealingly sleeved on the tube and in the bottle.

Some embodiments further comprise a sealing ring situated between the refill mechanism and outside the dispenser.

In some embodiments the walls are rigid, configured to allow making a negative air pressure in the upper cavity, the negative pressure thereby facilitating filling of the upper cavity with the viscous composition.

There may be essentially no take up of air in the upper cavity in compensation for the viscous composition dispensed.

In some embodiments wherein the filling is facilitated by the negative pressure, the dispensing mechanism comprises a vent hole that is arranged to compensate for dispensed viscous composition with air.

In some embodiments, the dispensing mechanism is mounted on the body in a storage position in which the vent hole is closed off, said dispensing mechanism being movable with respect to the body in a dispensing position which said vent hole is free to enable air to be taken up.

The refill mechanism may be covered reversibly by a sealing cap.

The refill mechanism may have a seat that is movable and/or deformable between a stable state of sealed closure of the upper cavity and a stressed state of putting a non-refillable dispenser in communication with said upper cavity.

The refill mechanism may be disposed on a lower end of the bottle.

The dispensing device may comprise a dispensing pump actuatable by means of a push button, the push button mounted on a nozzle of the pump, the push button comprising an upper region enabling exertion of finger pressure on said push button in order to be able to move said button axially, thereby actuating the pump; the pump comprising:
- a body equipped with a plunger tube disposed in the upper cavity, said tube being equipped with a valve for admitting the viscous material into the pump;
- a piston mounted around said nozzle in order to delimit a metering chamber in the body; the piston enabling supply orifices of the nozzle to open—or respectively close—over a dispensing—or respectively suction—travel of said nozzle;
- an extender within the body; and
- a spring in abutment with a bottom of the extender,
- return of the push button over its suction travel being affected by a spring in said pump.

BRIEF DESCRIPTION OF THE FIGURES

In order to better understand the present invention and appreciate its practical applications the following figures are provided. Like components are denoted by like reference numerals It should be noted that the figures are given as examples and preferred embodiments only and in no way limit the scope of the present invention as defined in the Detailed Description and Claims chapters.

FIG. 11 shows the top part of an embodiment in which the pump is mounted so as to be able to slide with respect to the body to a lower position in which the vent hole is free to enable air to be taken in.

FIG. 12 shows the top part of an embodiment depicted in FIG. 11, wherein the pump is in a higher storage position, in which the vent hole is not free to enable air to be taken in.

DETAILED DESCRIPTION OF THE INVENTION

The present invention addresses the problem of waste of containers of viscous compositions, as the containers are normally discarded after one use. Additionally, due to the high viscosity of the compositions, a large amount of material is left stuck to the walls of the containers etc and is discarded together with the container.

Adding to the containers a refill mechanism allows the containers to be reused, and miniaturization of the refillable containers also allows to do two important things: 1) to put the containers in pocket/purse/wallet, etc., for convenient use outside home due to small size, and 2) to take small samples of a first viscous composition (e.g., cream), and then take small samples of a second viscous composition, i.e. the user can easily vary the composition. However, the miniaturization also exacerbates waste of material since a relatively large amount of material remains stuck inside the container, that might spoil, dry up and cake etc., and might adversely affect a different composition that is introduced into the container. Therefore, it is important to include in the dispenser a mechanism that allows thoroughly emptying viscous compositions out of the container.

Figure 1:
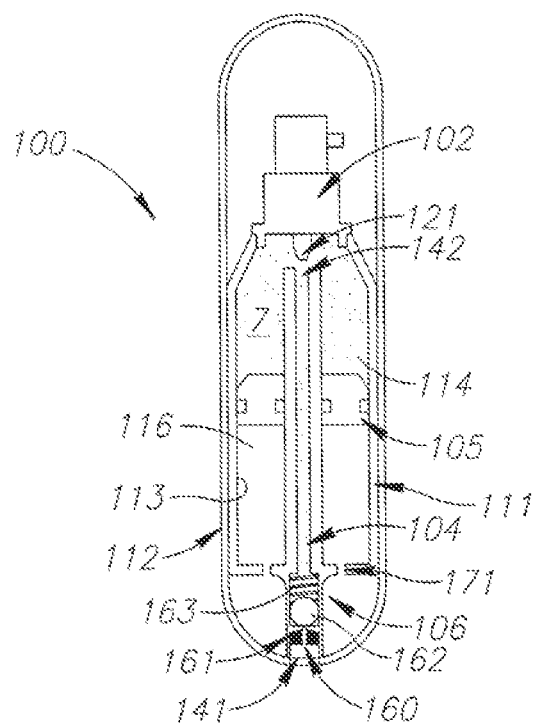
FIG. 1 is a frontal, sectional view of one embodiment.

Thus, according to one aspect, a refillable dispenser for viscous compositions is provided that is intended to solve all these problems. Referring to FIG. 1, the dispenser 100 comprises:

- a bottle 111 having walls defining an upper cavity 114 and a lower cavity 116;
- a viscous composition refill mechanism 106 configured to allow viscous composition to enter said upper cavity 114 when said refill mechanism 106 is fluidly coupled to a viscous composition source;
- a viscous composition dispensing mechanism 102 configured to allow viscous composition 7 to be dispensed from said upper cavity 114 to outside the bottle 111 when the dispensing mechanism 102 is actuated; and
- a gasket 105 configured to substantially seal said upper cavity 114 from said lower cavity 116 wherein said gasket 105 is capable of moving towards the upper cavity 114 upon actuation of the dispensing mechanism 102 and moving towards the lower cavity 116 upon entrance of the viscous composition 7 into said upper cavity 114.

When the dispensing mechanism 102 is actuated, some viscous material 7 such as cream is ejected from the dispensing mechanism 102 to outside the bottle 111. In some embodiments, the material ejected from the mechanism 102 is replaced by more material drawn in by the dispensing mechanism 102 from the same actuation. As the material 7 is drawn out of the upper cavity 114, gasket 105 may rise, thus maintaining pressure in the upper cavity 114 and keeping the (smaller) cavity 114 full of cream. Air may concomitantly enter via hole 171 into the lower cavity 116, thus preventing creation of sub-pressure in lower cavity 116. When the refill mechanism 106 is actuated, the material 7 enters the upper cavity 114 and forces the gasket 105 downwards, i.e., the upper cavity 114 expands and the lower cavity 116 contracts, releasing air via the hole 171.

Other embodiments have alternative exhaust/pressure maintenance means.

Some embodiments may entirely lack holes 171 in the walls, such that the only openings in the bottle 111 are for the refilling mechanism and the dispensing mechanism.

The dispensing mechanism 102 may comprise a pump: when the pump is actuated, e.g., in some embodiments pushed down, thus compressing the space inside the pump containing viscous material, the pump pushes viscous material out. When the pump is released, viscous material is drawn up from the upper cavity 114 into the pump. In preferred embodiments, the pump is configured to not allow air into the upper cavity. In other embodiments, air is allowed into the upper cavity but is pumped out with actuation of the pump.

The dispenser 100 may be a foam dispenser: In embodiments having foam dispensers, the dispenser may comprise dual or more pumps, which when used move both air and the viscous composition through a small opening to create lather, shaving cream. In preferred embodiments, the air is preferably introduced to the pump/s from outside the bottle 111.

In some embodiments, the dispenser is automatic, activated by a signal such as time-activation.

Figure 2:
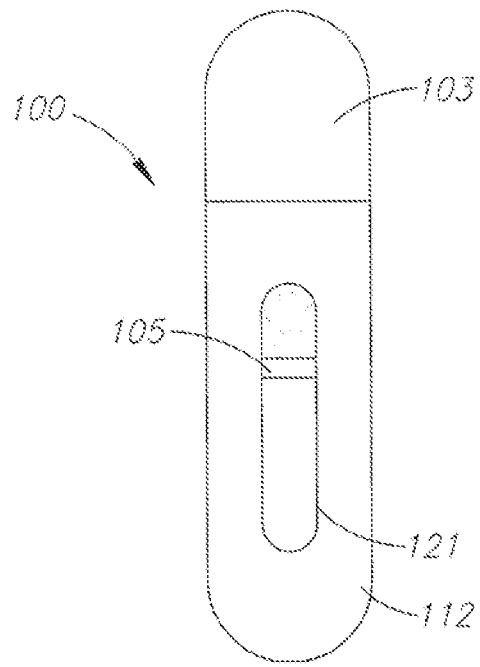
FIG. 2 is a frontal view of an embodiment such as shown in FIG. 1, filled from the bottom part of the embodiment.
Figure 3:
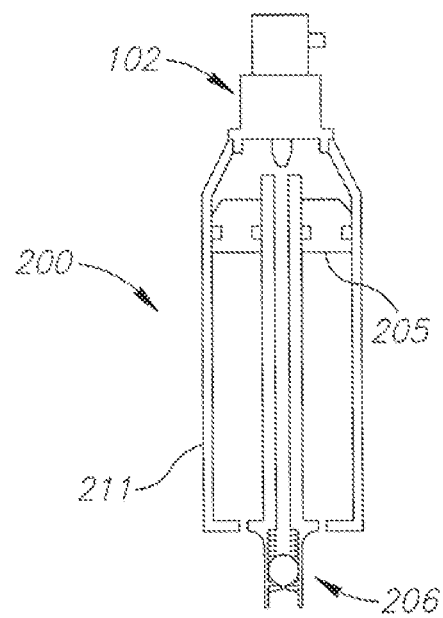
FIG. 3 presents another embodiment, empty.

As shown in FIG. 2, the dispenser 100 further comprises a cap 103 to cover the dispensing mechanism 102 and an external bottle body 112 that complements the cap 103. The external body 112 has a transparent window 121 through which the material 7 level can be measured to assess when to refill the dispenser 100. However, some embodiments lack these features, as shown in FIG. 3. The dispenser 200 similarly comprises a bottle 211, a dispensing mechanism 202, a refill mechanism 206 and a gasket 205. The dispenser as depicted is empty.

FIG. 3 presents another embodiment 200, empty, which includes bottle 211, dispensing mechanism 102, gasket 205, and filling mechanism 206.

Figure 4:
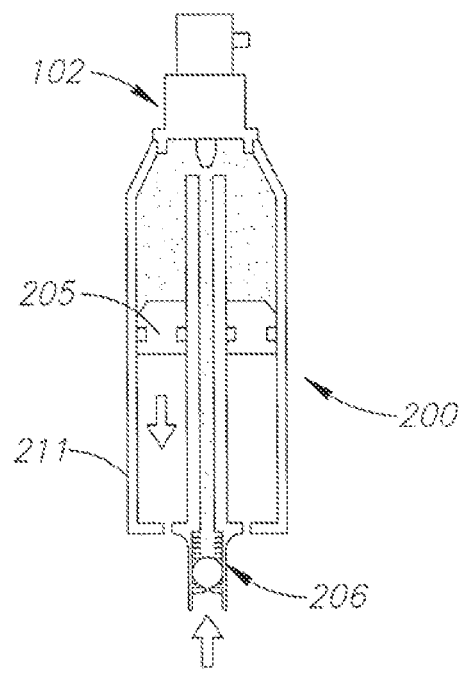
FIG. 4 depicts the embodiment partially filled.
Figure 5:
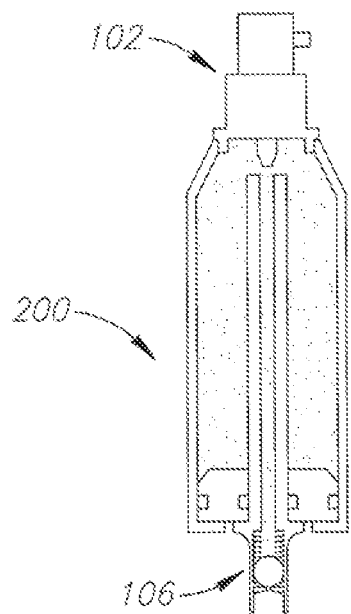
FIG. 5 depicts the embodiment full.

FIG. 4 shows the bottle 211 partially full, and FIG. 5 shows the same bottle 211 completely full with a viscous composition 7.

The refill mechanism in FIG. 1 is defined as including the tube 104. Thus, the refill mechanism extends from outside the bottle 111 and throughout the lower cavity 116 and the gasket 105, so that the composition 7 can be conveniently provided from the bottom of the bottle 111. The gasket 105 is sealingly sleeved on the tube and in the bottle. In some embodiments the tube may be proximal or flush with or even part of the wall, in which case the gasket may not be holed, yet it may nevertheless effectively seal the upper cavity from the lower cavity.

Figure 6:
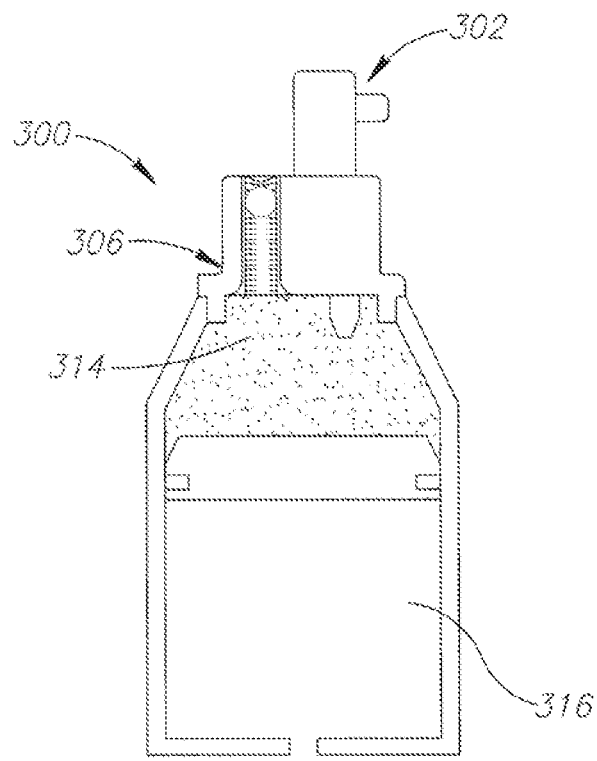
FIG. 6 illustrates another embodiment, filled from the top part of the embodiment.

FIG. 6 shows an embodiment 300 wherein the refill mechanism 306 does not extend throughout the lower cavity 316. Instead, the refill mechanism 306 is installed in the dispenser 300 such that it directly extends to or into the upper cavity 314. The dispenser 300 may be particularly useful for filling the dispenser 300 from containers having dispensing heads with orifices facing downwards.

Figure 7:
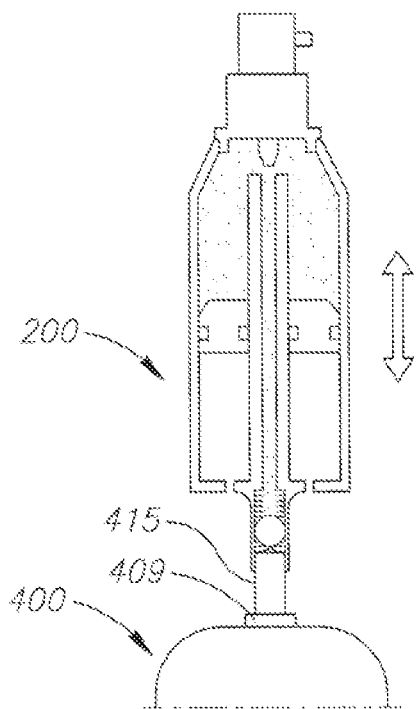
FIG. 7 is a view of the embodiment and a master bottle holding cream to be refilled in the refill bottle, as well as a filling operation.
Figure 8:
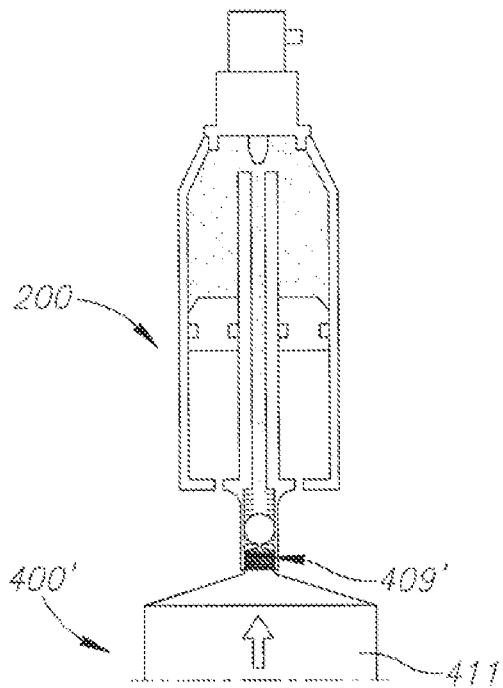
FIG. 8 shows cream moving from the master bottle to the refill bottle.

FIGS. 7 and 8 illustrate filling of the refillable dispenser 200 by non-refillable dispensers 400, 400'. The dispensing mechanism 409 of the dispenser 400 shown in FIG. 7 is actuated by a pumping action, whereas the dispensing mechanism 409' of the dispenser 400' shown in FIG. 8 is actuated by pressing the refillable dispenser 200 and the non-refillable dispenser 400' toward each other. Bottle 411 containing the viscous composition may be pressurized.

In some embodiments the refill mechanism comprises a check-valve.

In some embodiments, the dispensing mechanism comprises a check valve (to help prevent entrance of air into the upper cavity 114 via the valve).

In some embodiments, both the refill mechanism and the dispensing mechanism each comprise a check-valve.

Commercially available dispensers can perhaps be refilled by removing their dispensing mechanism, but for all practical purposes such refilling is time consuming and difficult, and thus they are essentially non-refillable. Furthermore, their size, typically 250 mL or larger, is substantially larger than the refillable dispensers, which are typically less than 100 mL size, so that there is little motivation to refill the larger dispensers.

Thus, according to another aspect, a kit comprising any refillable dispenser of the types described above, and at least one adapter is provided, the adapters each configured to allow sealingly and fluidly connecting a non-refillable dispenser for viscous compositions with the filling mechanism of the refillable dispenser. Each adapter is suitable for a particular structure of dispensing mechanism of the non-refillable dispenser. Thus, a set of adapters may serve to couple the first refillable dispenser with various commercially available non-refillable d dispensers.

Many commercially available dispensers have a dispensing head (not shown) that may be removed in order to expose the dispensing mechanism 409 of the non-refillable dispenser 400, the exposed mechanism 409 may then be easily coupleable to the refill mechanism. Such removal will typically expose a structure such as a stem 415 of the dispensing mechanism 409 (see FIG. 7).

The adapter may be a tube having ends with the same or different sizes. Typically, one end tightly fits into the refill mechanism of the refillable dispenser, and the other end tightly fits onto a stem of the dispensing mechanism of the non-refillable dispenser to make a sealed connection for transfer of the viscous composition from the non-refillable dispenser to the refillable one. Alternatively, the adapter may be a dispensing mechanism itself that replaces the original dispensing mechanism of the non-refillable dispenser.

In other embodiments the non-refillable dispenser is simply a receptacle without any dispensing mechanism at all, for example, a jar for cream with a thread at the top and a lid with a matching thread, and the adapter is then coupled to the jar without the lid. In preferred embodiments, the refill mechanism of the refillable bottle further comprises at least one sealing ring, as shown in FIG. 1 ring 161 in a refill hole 160 below a check valve (in FIG. 1 comprising a ball 162 and compression spring 163) to provide a sealed connection.

According to another aspect, a kit comprising the refillable dispenser and a non-refillable dispenser is provided. The uniqueness of the non-refillable dispenser in this embodiment is that the refillable dispenser and the non-refillable dispenser are configured to allow sealingly connecting the non-refillable dispenser with the refill mechanism, preferably without need for an adapter. Such non-refillable dispenser may be a commercially available dispenser, the refillable dispenser being specially fitted in the dimensions of the refill mechanism to the dispensing mechanism of the non-refillable dispenser, but perhaps more typically the non-refillable dispenser is also specially designed to easily and tightly fit with the refillable dispenser.

Typically, the non-refillable dispenser will be economy-sized and too large to carry in a wallet, pocket etc. The non-refillable dispenser further minimizes waste of material.

It is notable that while the non-refillable refillable dispenser is ideal to use at home, the refillable dispenser is ideal for use on airplanes, since at present only very small containers of viscous compositions are allowed to be airborne in a flight cabin.

Some embodiments may be manipulated to have a sub-pressure in the upper cavity, at least when the upper cavity is essentially empty of material and ready to receive more material. This may be accomplished by having a gasket that cannot travel all the way up to the top of the upper cavity, thus a space may be left after dispensing is finished, in which a sub-pressure may be created.

For example, see FIGS. 9-12.

The dispenser 500 comprises a rigid body 501 in which there is upper cavity 502 sealed from lower cavity 516 by gasket 530. In particular, the body 501 has sufficient rigidity so that the volume of the upper cavity 502 remains substantially constant. The upper cavity 502 may have for example a capacity of between 1 and 20 ml (whereby the dispenser is conveniently pocket-sized).

The body 501 may be in a single piece, for example produced by injection blowing or extrusion blowing, or in several parts injected and then assembled, for example by ultrasonic welding, made from rigid plastics material, metal, for example, aluminum, or glass.

The dispenser 500 also comprises a dispensing device 503 that is mounted sealingly on the body 501, in particular in the top opening of said body. In the embodiments shown, the dispensing device comprises a dispensing pump 503 actuated manually by means of a push button 504.

The pump 503 comprises a body 505 equipped with means of supplying the material. In the figures, the supply means comprise a plunger tube 506 disposed in the upper cavity 502, said tube being equipped with a valve 507 for admitting the product (viscous material) into the pump 503. The push button 504 is mounted on the nozzle 508 of the pump 503, which comprises a piston 509 mounted around said nozzle in order to delimit a metering chamber 510 in the body 501. The piston 509 enables the supply orifices 511 of the nozzle 508 to open—or respectively close—over a dispensing—or respectively suction—travel of said nozzle.

The push button 504 comprises an upper region enabling the user to exert finger pressure on said push button in order to be able to move it axially over its travel for actuation of the pump 503, the return of the push button 504 over its suction travel being conventionally effected by a spring 512. In the embodiment shown, the interior of the body 505 of the pump 503 is equipped with an extender 513 on which the bottom end of the spring 512 is in abutment.

The push button 504 is equipped with a head 514 that is arranged to distribute the product radially. However, the invention is not limited to a particular method of dispensing the product.

The dispensing method makes provision, prior to the initial filling of the upper cavity 502 with product, for putting said empty product reservoir in communication with an air suction device and activating said device in order to create a negative pressure inside said reservoir.

According to one embodiment, the air suction device comprises a vacuum bell in which the dispensing mechanism 505 is disposed the sealed mounting of the take-off device 503 on the body 501 being achieved after activation of said bell. Thus, the negative pressure is formed in the upper cavity 502 and then the take-off device 503 is mounted sealingly so as to maintain said negative pressure.

According to another embodiment, the air suction device, for example a vacuum pump, is put in communication with the take-off device 503 after sealed mounting thereof on the body 501, the suction of the air from the upper cavity 502 being effected through said take-off device. In a variant, the suction of air could be effected through the refill mechanism (not shown) by making provision to put it into communication with the air suction device after sealed mounting of the take-off device 503 on the body 501.

The dispensing method makes provision for subsequently effecting the initial filling of the upper cavity 502 by putting a product source in sealed communication with said upper cavity 502 by means of the refill mechanism so that the negative pressure causes the filling of said reservoir by suction of the product contained in said source. Next, the customer can actuate the take-off device 503 in order to dispense the packaged product.

A single press on the refill mechanism may cause the opening of a valve in the refill mechanism, as well as possibly the opening of a pump of a non-refillable dispenser, so as to form a transfer path of product between the source and the upper cavity 502. Compensation for the negative pressure then allows filling. Next, when the upper cavity 502 is filled, the suction negative pressure becomes zero and the valve of the refill mechanism is then closed and the product contained in the upper cavity 502 can be dispensed subsequently by means of the take-off device 503.

The 500 that is supplied to the distributors may therefore be empty of product and have a negative air pressure, said negative pressure making it possible to subsequently effect the initial filling, in particular at the time of handing the dispenser 500 to the customer according to the product that they wish to purchase and/or test. The method therefore allows a particularly versatile initial filling, which in particular allows simplified management of the dispenser 500s by the distributors, in particular sample test dispenser 500s.

The versatility of the dispensing method can also be improved by providing the association of a label on the body 501 at the time of initial filling of the upper cavity 502 with product, in particular according to said product. The label can have a detachable part comprising a sales offer particular to the distributor in order to encourage the customer to return and purchase the sampled product.

Figure 9:
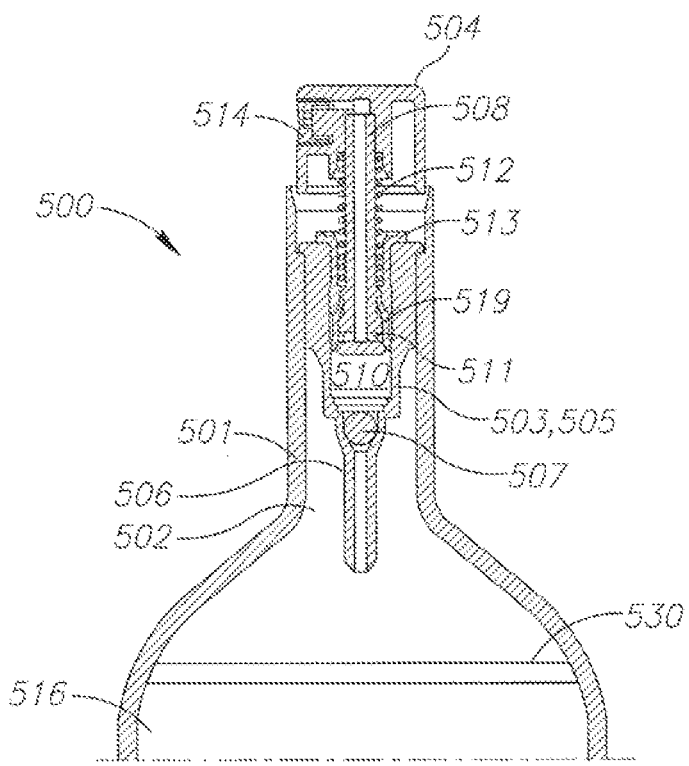
FIG. 9 illustrates the top portion of an embodiment without take up of air in the upper cavity in compensation for the volume of product dispensed, wherein the body of a dispensing pump has no vent hole.
Figures 10, 10A:
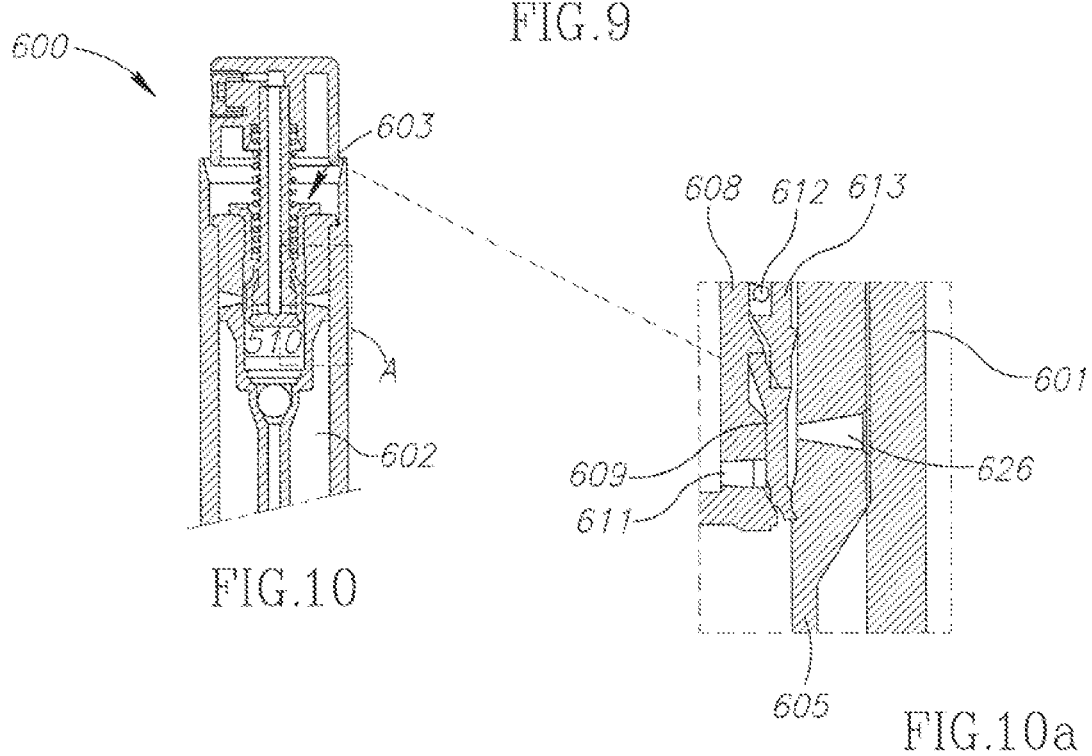
FIG. 10 shows the top part of a similar embodiment; however the body of the dispensing pump does have vent holes.
FIG. 10a is an exploded view of a portion of the part shown in FIG. 10.

In relation to FIGS. 9 and 10, the take-off device in embodiments 500, 600 is of the airless type without the take up of air in the upper cavity in compensation for the volume of product dispensed. To do this, the body 505 of the pump 503 in embodiment 500 has no vent hole.

However, since pumps with a vent hole are the most usual, it may be advantageous to create a negative pressure in the upper cavity even with this type of pump. To do this, as shown in embodiment 600 in FIG. 10, body 605 is provided with a vent hole 626 that is closed off sealingly by mounting thereof in the rigid body 601 (FIG. 10a). In particular, the seal between the body 605 and rigid body 601 is then made at least below the vent hole 626 so as to prevent the passage of air from the pump 603 into the upper cavity 602 by means of said hole. In FIG. 10, the seal is also achieved above the vent hole 626, which does not impair the functioning without take up of air and is a little simpler to achieve.

The product sample without take up of air in the upper cavity 602 makes it possible to create in said upper cavity 602 a negative pressure that increases along with dispensing. In particular, in order to ensure total emptying of the upper cavity 602, the ceiling of air above the product during initial filling must be such that the negative pressure reached at the end of emptying is at a maximum equal to the negative pressure achievable by the pump 603.

In this embodiment, the dispensing method then provides for the possibility of subsequent tilling of the upper cavity 602 by the sealed putting in communication of the product source (non-refillable dispenser) with said upper cavity 602 by means of the refill mechanism so that the negative pressure causes the filling of said upper cavity 602 by suction of the product contained in said source.

Figure 11:
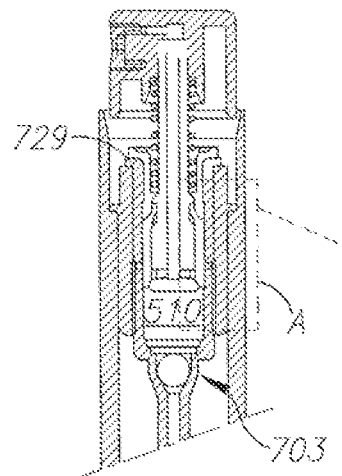
Figure 12:
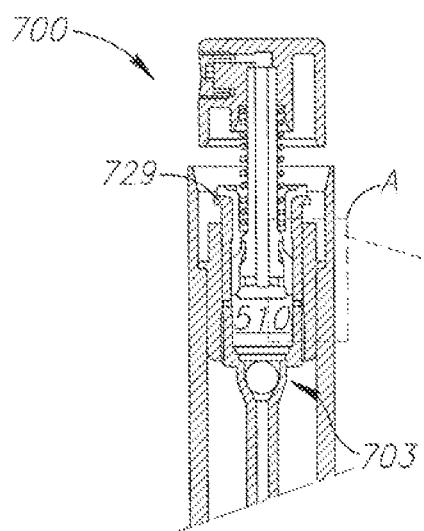
Figure 12A:
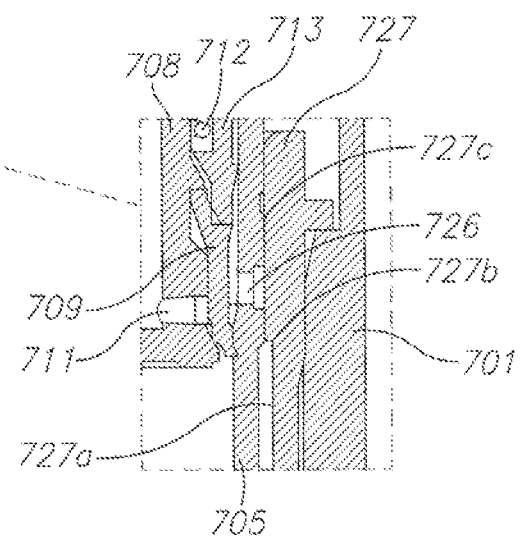
FIG. 12a is an exploded view of a portion of the part shown in FIG. 12.

In relation to FIGS. 11 and 12, the product is taken off with take up of air in the upper cavity so as to prevent the subsequent filling of said upper cavity by suction. To do this, the pump comprises a vent hole that is arranged to make it possible to compensate for the volume of product taken off in the upper cavity with air.

Figure 11A:
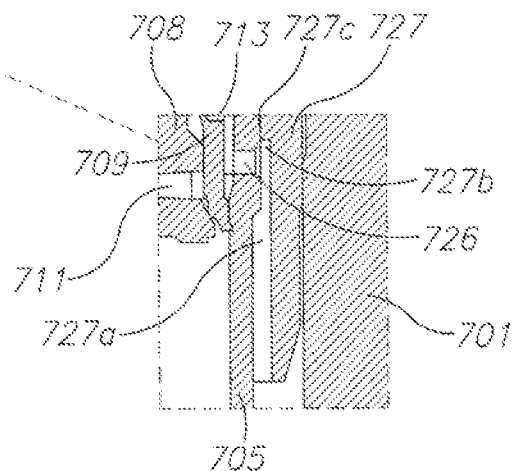
FIG. 11a is an exploded view of a portion of the part shown in FIG. 11.

In relation to FIG. 11, the pump 703 in the embodiment 700 is mounted in the body 701 by means of a sleeve 727 in which the body 705 is fitted sealingly. The vent hole 726 is formed in the body 702 radially opposite an increased diameter 727a that is formed on the sleeve 727 so as to leave free said hole in order to enable air to be taken into the upper cavity 702 (FIG. 11a).

According to one embodiment, the dispensing method may, prior to the initial filling of the upper cavity with product, provide for the mounting of the take-off device on the body in a storage position in which the air tightness of the upper cavity is reinforced, said take-off device subsequently being moved into a dispensing position. This is because, in the dispensing position, the static air tightness of the upper cavity having a negative pressure may be insufficient, in particular in the presence of a vent hole, to guarantee the maintenance of this negative pressure at the end of prolonged storage.

In addition, still in order to improve the maintenance of the negative pressure over time, the refill mechanism may be reversibly covered with a sealing cap (not shown). The cap may be welded in a recess formed on the free end of a trim (not shown) so that said cap completely covers the refill mechanism, said cap having a free edge enabling it to be withdrawn with a view to the initial filling.

In relation to FIGS. 11 and 12, the pump 703 is mounted so as to be able to slide with respect to the body between an upper storage position in which the vent hole is closed off (FIG. 12) and a lower dispensing position (FIG. 11) in which said vent hole 726 is free to enable air to be taken in.

In particular, the body 703 is mounted in the sleeve 727 with clamping suitable for enabling sliding, the passage between these positions being achieved by pressing on the push button 704 when the pump 703 is first actuated. The sleeve 727 has a step 727b delimiting an upper diameter 727c for sealed mounting of the body 705 in order to close off the vent hole 726 and an increased lower diameter 727a leaving said vent hole free, said pump body having a stop 729 for the end of sliding travel in the sleeve 727.

The sub-pressure may facilitate refilling the dispenser 700. Such embodiments are more useful when the material is not overly viscous, such as various lotions. Shaking the lotion (thereby sometimes reducing the viscosity) just prior to refilling may facilitate the refilling in such cases.

Some creams and lotions and colloids may undergo sedimentation, flocculation etc, such that the separation of solids is both undesirable as a product to be applied, and may in some embodiments interfere with the operation of the dispenser, in which case it may be advantageous to shake the dispenser shortly before dispensing. In such cases excessive shaking may be ill-advised, as the shaking may overly reduce the viscosity of the viscous material. Some experimentation may be required to produce the most desirable results, both in respect of the quality of the material, and in respect of the more satisfactory operation of the dispenser. Some embodiments may be more suitable for particular types of viscous materials.

Returning to FIG. 1, note that the top of gasket 105 is bullet-shaped, i.e., narrower at the top, as is the part of the upper cavity 114, facilitating emptying the bottle 111 of viscous material 7. The top part of the gasket 105 may generally conform to the shape of the top part of the upper cavity, so that the gasket 105 can easily reach the topmost part of the upper cavity 114 and essentially exhaust the bottle 111 of the viscous material if so desired. However, in other embodiments the top of the bottle 111 is not bullet shaped. Furthermore, the gasket is preferably flexible, and so in embodiments having bullet-shaped upper cavities, the gasket may be capable of being easily moved and conforming in shape to the walls at the top of the upper cavity.

The examples described above present various selected embodiments of a refillable cream dispenser. It is noted that further embodiments are anticipated which also fall within the scope of the present invention. The scope of the present invention is defined by the claims and includes both combinations and sub combinations of the various features described hereinabove as well as variations and modifications thereof, which would occur to persons skilled in the art upon reading the foregoing description.

The invention claimed is:

1. A refillable dispenser for viscous compositions comprising:
    a bottle having walls defining an upper cavity and a lower cavity;
    a viscous composition refill mechanism configured to allow viscous composition to enter said upper cavity when said refill mechanism is fluidly coupled to a viscous composition source;
    a viscous composition dispensing mechanism configured to allow viscous composition to be dispensed from said upper cavity to outside the bottle when the dispensing mechanism is actuated;
    a gasket configured to substantially seal said upper cavity from said lower cavity, wherein said gasket is capable of moving towards the upper cavity upon actuation of the dispensing mechanism and of moving towards the lower cavity solely upon entrance of the viscous composition into said upper cavity through said refill mechanism.

2. The refillable dispenser of claim 1, wherein the refill mechanism extends throughout the gasket to the upper cavity.

3. The refillable dispenser of claim 2, wherein the refill mechanism comprising a tube extending into the upper cavity.

4. The refillable dispenser of claim 2, wherein the refill mechanism directly extending into the upper cavity.

5. The refillable dispenser of claim 1, wherein the refill mechanism comprises a check-valve.

6. The refillable dispenser of claim 1, wherein the dispensing mechanism comprises a check valve.

7. The refillable dispenser of claim 1, wherein the refill mechanism and the dispensing mechanism each comprise a check-valve.

8. A kit comprising: the refillable dispenser of claim 1 and at least one adapter, the adapters each configured to allow sealingly and fluidly coupling a non-refillable dispenser for viscous compositions with the refill mechanism of the refillable dispenser.

9. A kit comprising: the refillable dispenser of claim 1 and a non-refillable dispenser for viscous compositions, the refillable dispenser and the non-refillable dispenser sealingly and fluidly coupleable thereto.

10. The kit of claim 8, wherein the non-refillable dispenser is substantially larger than the refillable dispenser.

11. The dispenser of claim 4, wherein the gasket is sealingly sleeved on the tube and in the bottle.

12. The dispenser of claim 1, further comprising a sealing ring situated between the refill mechanism and outside the dispenser.

13. The dispenser of claim 1, wherein the walls are rigid, configured to allow making a negative air pressure in the upper cavity, the negative pressure thereby facilitating filling of the upper cavity with the viscous composition.

14. The dispenser of claim 13, wherein there is essentially no take up of air in the upper cavity in compensation for the viscous composition dispensed.

15. The dispenser according to claim 14, wherein the dispensing mechanism comprises a vent hole that is arranged to compensate for dispensed viscous composition with air.

16. The dispenser of claim 13, wherein the dispensing mechanism is mounted on the body in a storage position in which the vent hole is closed off, said dispensing mechanism being movable with respect to the body in a dispensing position which said vent hole is free to enable air to be taken up.

17. The dispenser of claim 13, wherein the refill mechanism has a seat that is movable and/or deformable between a stable state of sealed closure of the upper cavity and a stressed state of putting a non-refillable dispenser in communication with said upper cavity.

18. The dispensing bottle of claim 13, characterized in that the refill mechanism is disposed on a lower end of the bottle.

19. The dispenser of claim 1, wherein the dispensing device comprises a dispensing pump actuatable by means of a push button, the push button mounted on a nozzle of the pump, wherein the push button comprising an upper region enabling exertion of finger pressure on said push button in order to be able to move said button axially, thereby actuating the pump;
    the pump comprising:
    a body equipped with a plunger tube disposed in the upper cavity, said tube being equipped with a valve for admitting the viscous material into the pump;
    a piston mounted around said nozzle in order to delimit a metering chamber in the body; the piston enabling supply orifices of the nozzle to open—or respectively close—over a dispensing—or respectively suction—travel of said nozzle;
an extender within the body;
a spring in abutment with a bottom of the extender, return of the push button over its suction travel being effected by a spring in said pump.

* * * * *